(12) United States Patent
Salz

(10) Patent No.: US 9,116,885 B2
(45) Date of Patent: Aug. 25, 2015

(54) TECHNIQUES FOR A GENDER WEIGHTED PINYIN INPUT METHOD EDITOR

(75) Inventor: Jonathan Michael Salz, Taipei (TW)

(73) Assignee: Google Inc., Mountain View, CA (US)

( * ) Notice: Subject to any disclaimer, the term of this patent is extended or adjusted under 35 U.S.C. 154(b) by 893 days.

(21) Appl. No.: 13/350,885

(22) Filed: Jan. 16, 2012

(65) Prior Publication Data

US 2015/0161110 A1    Jun. 11, 2015

(51) Int. Cl.
| | |
|---|---|
| G06F 17/27 | (2006.01) |
| G10L 21/00 | (2013.01) |
| G10L 25/00 | (2013.01) |
| G06F 3/02 | (2006.01) |
| G09G 5/00 | (2006.01) |
| G06F 17/28 | (2006.01) |

(52) U.S. Cl.
CPC .................... *G06F 17/289* (2013.01)

(58) Field of Classification Search
CPC . G06F 17/28; G06F 17/2809; G06F 17/2836; G06F 3/018; G06F 17/2863; G06F 17/2223; G06F 3/0233; G06F 17/30669
USPC ............ 704/9, 270, 270.1, 275; 345/168, 171
See application file for complete search history.

(56) References Cited

U.S. PATENT DOCUMENTS

| | | | | |
|---|---|---|---|---|
| 5,084,817 | A * | 1/1992 | Kumano et al. .................... 704/4 |
| 5,568,383 | A * | 10/1996 | Johnson et al. .................... 704/2 |
| 6,023,669 | A * | 2/2000 | Suda et al. .......................... 704/2 |
| 6,385,568 | B1 * | 5/2002 | Brandon et al. .................... 704/7 |
| 8,566,075 | B1 * | 10/2013 | Bruner ................................ 704/2 |
| 2001/0044724 | A1 * | 11/2001 | Hon et al. ...................... 704/260 |
| 2002/0035467 | A1 * | 3/2002 | Morimoto et al. ................. 704/9 |
| 2003/0144832 | A1 * | 7/2003 | Harris .............................. 704/10 |
| 2006/0079281 | A1 * | 4/2006 | Ravindra et al. ............... 455/558 |
| 2006/0100847 | A1 * | 5/2006 | McEntee et al. ................... 704/4 |
| 2007/0022134 | A1 * | 1/2007 | Zhou et al. ..................... 707/102 |
| 2007/0203688 | A1 * | 8/2007 | Fuji et al. ........................... 704/2 |
| 2008/0208563 | A1 * | 8/2008 | Sumita ............................... 704/2 |
| 2010/0217581 | A1 * | 8/2010 | Hong ................................. 704/3 |

* cited by examiner

*Primary Examiner* — Eric Yen
(74) *Attorney, Agent, or Firm* — Remarck Law Group PLC

(57) ABSTRACT

A computer-implemented technique can receive a first input from a user including one or more characters of a first language, which is a transliteration of a second language. The technique can determine a coefficient indicative of a gender of the recipient. The technique can determine and display potential translations of the first input to the second language based on the coefficient. The technique can receive a selection by the user of one of the potential translations to obtain a selected character. The technique can adjust the coefficient based on the selected character to obtain a modified coefficient. The technique can determine and display potential translations of second input from the user to the second language based on the modified coefficient.

20 Claims, 6 Drawing Sheets

TECHNIQUES FOR A GENDER WEIGHTED PINYIN INPUT METHOD EDITOR

FIELD

The present disclosure relates to input method editors (IMEs) for computing devices and, more particularly, to techniques for a gender weighted Pinyin IME.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A "computing device" generally refers to any device that includes some or all of a user interface, a display, and one or more processors. Example computing devices include desktop computers, laptop computers, tablet computers, mobile phones, and the like. Computing devices may include input method editor (IME) software that allows a user to input characters to a computing device in a particular language. The computing device may have a plurality of different IMEs, which may allow the user to input characters in one or more different languages. Some languages, however, are not based on the Latin alphabet. For example, Chinese has thousands of different characters (symbols). The user interface of the computing device, however, may have a limited number of physical keys and/or a limited amount of touchscreen area to provide to the user for input.

SUMMARY

A computer-implemented technique is presented. The technique includes receiving, via a user interface of a computing device including one or more processors, a first input from a user, the first input including one or more Pinyin characters, the first input to be communicated to a second user. The technique includes determining, at the computing device, a coefficient indicating a gender of the second user. The technique includes determining, at the computing device, a first plurality of Chinese characters based on the first input and the coefficient, each of the first plurality of Chinese characters representing a potential translation of the first input. The technique includes providing for display, at a display associated with the computing device, the first plurality of Chinese characters. The technique includes receiving, via the user interface of the computing device, a selection by the user of one of the first plurality of Chinese characters to obtain a selected Chinese character. The technique includes adjusting, at the computing device, the coefficient based on the selected Chinese character to obtain a modified coefficient. The technique includes determining, at the computing device, the gender of the second user by comparing the modified coefficient to a gender-neutral coefficient, wherein the gender of the second user is determined to be male when the modified coefficient is less than or equal to the gender-neutral coefficient, and wherein the gender of the second user is determined to be female when the modified coefficient is greater than the gender-neutral coefficient. The technique includes receiving, via the user interface of the computing device, a second input from the user, the second input including one or more Pinyin characters, the second input also to be communicated to the second user. The technique includes determining, at the computing device, a second plurality of Chinese characters based on the second input and the gender of the second user, each of the second plurality of Chinese characters representing a potential translation of the second input. The technique also includes providing for display, at the display associated with the computing device, the second plurality of Chinese characters.

Another computer-implemented technique is also presented. The technique includes receiving, via a user interface of a computing device including one or more processors, a first input from a user, the first input including one or more characters of an alphabet-based language that is a transliteration of a non-alphabet-based language, the non-alphabet-based language being one of a logogram-based language and a syllabogram-based language, the first input to be communicated to a recipient. The technique includes determining, at the computing device, a coefficient indicative of a gender of the recipient. The technique includes determining, at the computing device, a first plurality of characters in the non-alphabet-based language based on the first input and the coefficient, each of the first plurality of characters representing a potential translation of the first input. The technique includes providing for display, at a display associated with the computing device, the first plurality of characters. The technique includes receiving, via the user interface of the computing device, a selection by the user of one of the first plurality of characters to obtain a selected character. The technique includes adjusting, at the computing device, the coefficient based on the selected character to obtain a modified coefficient. The technique includes receiving, via the user interface of the computing device, a second input from the user, the second input including one or more characters of the alphabet-based language, the second input also to be communicated to the recipient. The technique includes determining, at the computing device, a second plurality of characters in the non-alphabet-based language based on the second input and the modified coefficient, each of the second plurality of characters representing a potential translation of the second input. The technique also includes providing for display, at the display associated with the computing device, the second plurality of characters.

A system is also presented. The system includes an input determination module configured to receive a first input from a user, the first input including one or more characters of an alphabet-based language that is a transliteration of a non-alphabet-based language, the non-alphabet-based language being one of a logogram-based language and a syllabogram-based language, the first input to be communicated to a recipient. The input determination module is also configured to receive a second input from the user, the second input including one or more characters of the alphabet-based language, the second input also to be communicated to the recipient. The input determination module is also configured to receive a selection by the user of one of a first plurality of characters to obtain a selected character. The system includes a coefficient determination module configured to determine coefficient indicative of a gender of the recipient. The system includes a character determination module configured to determine the first plurality of characters in the non-alphabet-based language based on the first input and the coefficient, each of the first plurality of characters representing a potential translation of the first input. The character determination module is also configured to determine a second plurality of characters in the non-alphabet-based language based on the second input and a modified coefficient, each of the second plurality of characters representing a potential translation of the second input. The system includes a coefficient adjustment module configured to adjust the coefficient based on the selected character to obtain the modified coefficient. The system also includes a display control module configured to provide the first plurality of characters for display. The display control module is also configured to provide the second plurality of characters for display.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
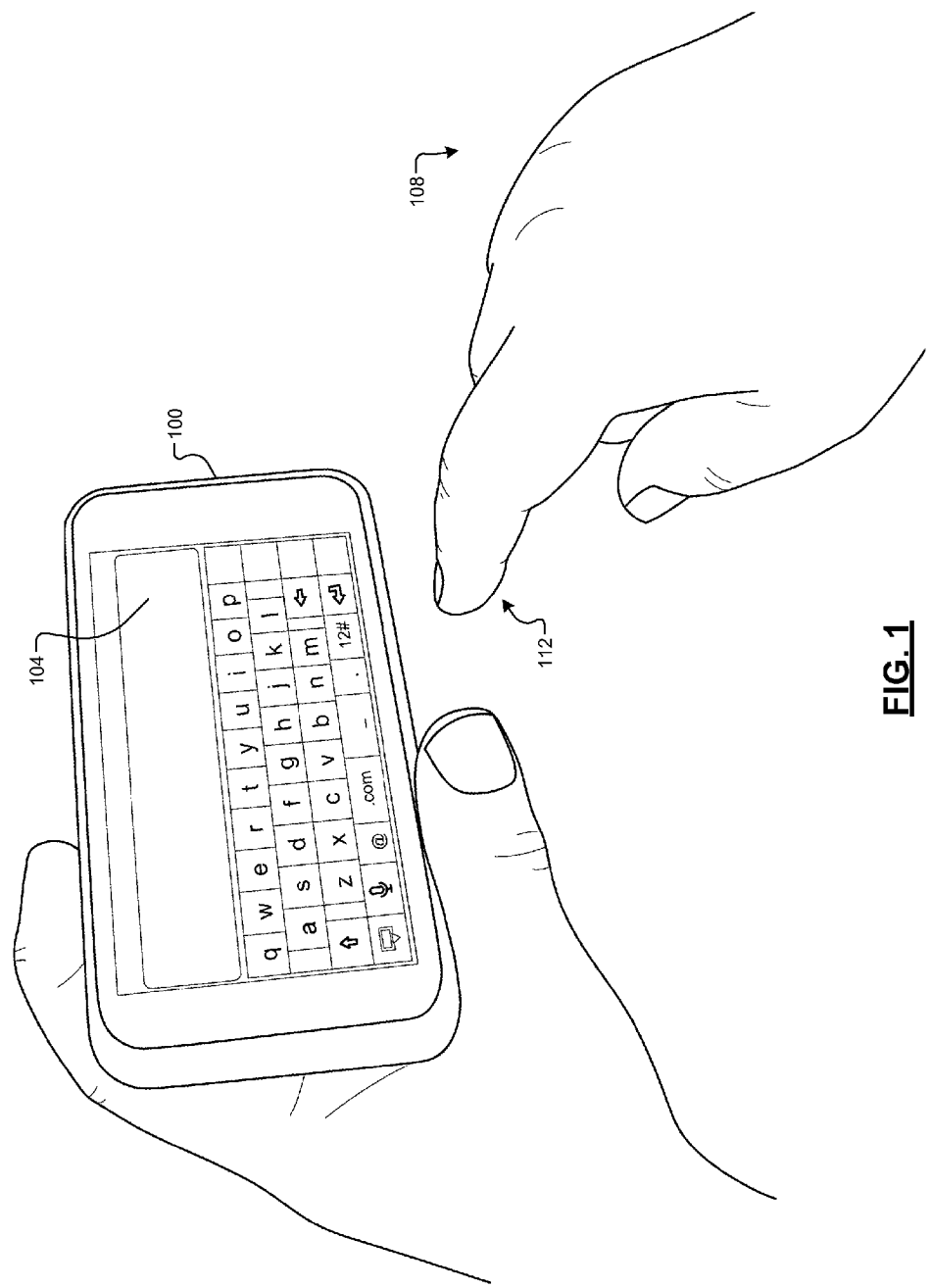
FIG. 1 is a schematic illustration of an example interaction between a user and a computing device according to some implementations of the present disclosure.

Referring now to FIG. 1, an example interaction between a user 108 and a computing device 100 is illustrated. For example, the computing device 100 can be a mobile phone as shown. The computing device 100 can also be a desktop computer, laptop computer, tablet computer, or the like. The computing device 100 can include a display 104 that displays information. The computing device 100 can also include a user interface, e.g., a keyboard, that allows the user 108 to provide input to the computing device 100. As shown, the display 104 is a touch display, which can both display information and receive the input by the user 108, e.g., using one or more fingers 112.

Computing devices, such as the computing device 100, can be used worldwide. Some languages, however, have scripts that are not based on the Latin alphabet (non-alphabet-based languages). These languages can include logogram-based languages, e.g., Chinese, and/or syllabogram-based languages, e.g., Japanese. Moreover, some of these non-alphabet-based languages can have thousands of different characters. As previously described, the area of the display 104 (or another suitable user interface such as a keyboard) may be limited. The computing device 100, therefore, can have one or more input method editors (IMEs) that permit a user to input characters to the computing device 100 in a particular language.

One example of an IME may be a Pinyin IME. Pinyin refers to a system for transcribing Chinese characters into Latin alphabet characters. Pinyin can also be referred to as a transliteration of Chinese. Transliteration refers to the process of converting one script to another script. A Pinyin IME allows the user to input Chinese characters to the computing device 100 by inputting combinations of Latin alphabet characters. The combinations of Latin alphabet characters can then be translated to Chinese characters according to the Pinyin system.

Traditional Chinese characters, such as those used in Hong Kong and Taiwan, may require additional gender indicators. Many users that input Chinese characters to computing devices using Pinyin IMEs, however, do not provide the additional gender indicators due to time restrictions. In other words, many users inputting Chinese characters to computing devices using Pinyin IMEs ignore gender to save time. In such cases, a computing device typically defaults to a male gender. While gender is not required for all Chinese words, gender is required for many commonly used words such as "you" (male), "you" (female), "him", and "her". In addition, simplified Chinese can require gender for "him" and "her".

Accordingly, techniques are presented for a gender weighted Pinyin IME. The techniques generally provide for more accurate user input to a computing device and/or an improved user experience. The techniques can include receiving, via a user interface of a computing device including a display and one or more processors, a first input from a user. The first input can include one or more characters in an alphabet-based language that is a transliteration of a non-alphabet-based language. The non-alphabet-based language may be a logogram-based language, e.g., Chinese, or a syllabogram-based language, e.g., Japanese. The first input can be intended for communication to a second user, e.g., an e-mail or text message.

The techniques can include determining, at the computing device, a coefficient indicating a gender of the second user. A first plurality of characters of the non-alphabet-based language may be determined based on the first input and the coefficient. Each of the first plurality of characters can represent a potential translation of the first input. The first plurality of characters can be displayed at a display of the computing device. The techniques can include receiving, via the user interface of the computing device, a selection of one of the first plurality of characters by the user to obtain a selected character. The coefficient can be adjusted based on the selected character to obtain a modified coefficient. The coefficient may also be adjusted based on a weighting factor indicating a degree by which the base coefficient is adjusted based on the selected character.

In some implementations, the gender of the second user can then be determined by comparing the modified coefficient to a gender-neutral coefficient. The techniques can include receiving, via the user interface of the computing device, a second input from the user. The second input can include one or more characters in the alphabet-based language and can also be intended for communication to the second user. The techniques can include determining, at the computing device, a second plurality of characters in the non-alphabet-based language based on the second input and the modified coefficient (or the determined gender). Each of the second plurality of characters can represent a potential translation of the second input. The second plurality of characters may then be displayed at the display of the computing device.

The first input can include a plurality of characters that represent a phrase in the alphabet-based language, e.g., Pinyin. The first plurality of characters, therefore, can include a plurality of different characters or combinations of characters that each represent a potential translation of the first input to the non-alphabet-based language, e.g., Chinese. Providing suggested characters or combinations of characters for phrases can increase a speed of the first user's input. The techniques can determine the first plurality of characters using a language model. The language model can include mappings between various phrases in the alphabet-based language and translations of the phrases in the non-alphabet-based language.

The techniques can further include training the language model when the first input includes a new phrase such as an unknown or unrecognized phrase. In these cases, the first user may be required to select a character in the non-alphabet-based language for each portion, e.g., syllable, of the new phrase. When the new phrase includes a syllable that requires gender, the user will select a gender-specific character (either male or female) in the non-alphabet-based language. In order to increase the accuracy of the language model, the techniques, however, should not map the new phrase to the selected gender-specific character alone, but instead to both the selected gender-specific character, e.g., male, and the unselected gender-specific character, e.g., female, in the language model. In this manner, the techniques store the new phrase in the language model such that the new phrase is gender-neutral. Once stored in the language model, when the first user inputs the new phrase, the techniques can determine which potential translation of the new phrase to provide to the first user according to the gender coefficient-based techniques described above.

Figure 2:
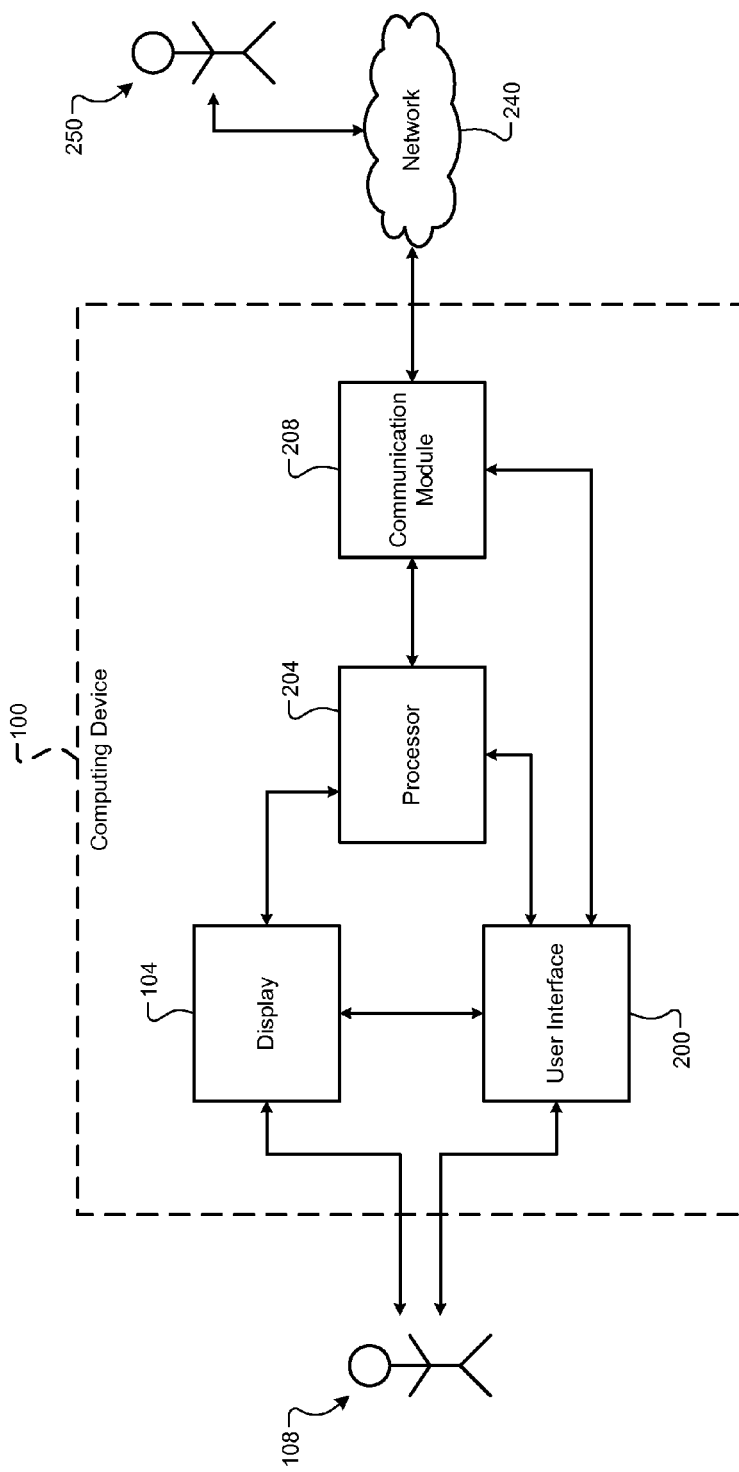
FIG. 2 is a functional block diagram of the computing device of FIG. 1.

Referring now to FIG. 2, a functional block diagram of the computing device 100 is illustrated. The computing device 100 can include the display 104, a user interface 200, a processor 204, and a communication module 208. The display 104 can be a touch display, e.g., a capacitive sensing display, which can be controlled by or interface with the user interface 200. It should be appreciated that while one processor 204 is shown and described herein, the computing device 100 can include one or more processors. It should also be appreciated that the computing device 100 can also include other computing components such as memory.

The user interface 200 controls communication between the user 108 (hereinafter "the first user 108") and the computing device 100. The user interface 200 can include components such as a keyboard, and the appropriate software for controlling or interfacing with the display 104. For example, the user interface 200 can provide information to display to the first user 108 at the display 104. As previously mentioned, the display 104 can be a touch display and therefore the user interface 200 could both interpret user input and provide information to the touch display. The user interface 200 can also execute one or more IMEs of the computing device 100, in conjunction with or separately from the processor 204. For example, the user interface 200 can execute the gender weighted Pinyin IME according to some implementations of the present disclosure.

The processor 204 controls operation of the computing device 100. The processor 204 can further control and/or communicate with the user interface 200 and/or the communication module 208. For example, the processor 204 may perform tasks such as, but not limited to, loading/controlling the operating system of the computing device 100, loading/configuring communication parameters for the communication module 208, controlling IME parameters of the user interface 200, and controlling memory storage/retrieval operations, e.g., for loading of the various parameters. In some implementations, the processor 204 can execute the gender weighted Pinyin IME according to some implementations of the present disclosure, e.g., in conjunction with the user interface 200 and/or the communication module 208.

The communication module 208 controls communications between the computing device 100 and other devices (not shown) such as a computing device associated with a second user 250 ("recipient"). For example only, the communication module 208 may provide for communication between the computing device 100 and other users associated with the first user 108, e.g., the second user 250, via a network 240. The network 240 can include at least one of a computing network, e.g., the Internet, a mobile telephone network, and a satellite network. Other communication mediums may also be used by the computing device 100. For example, the communication module 208 may be configured for both wired and wireless network connections, e.g., radio frequency (RF) communication.

Figure 3:
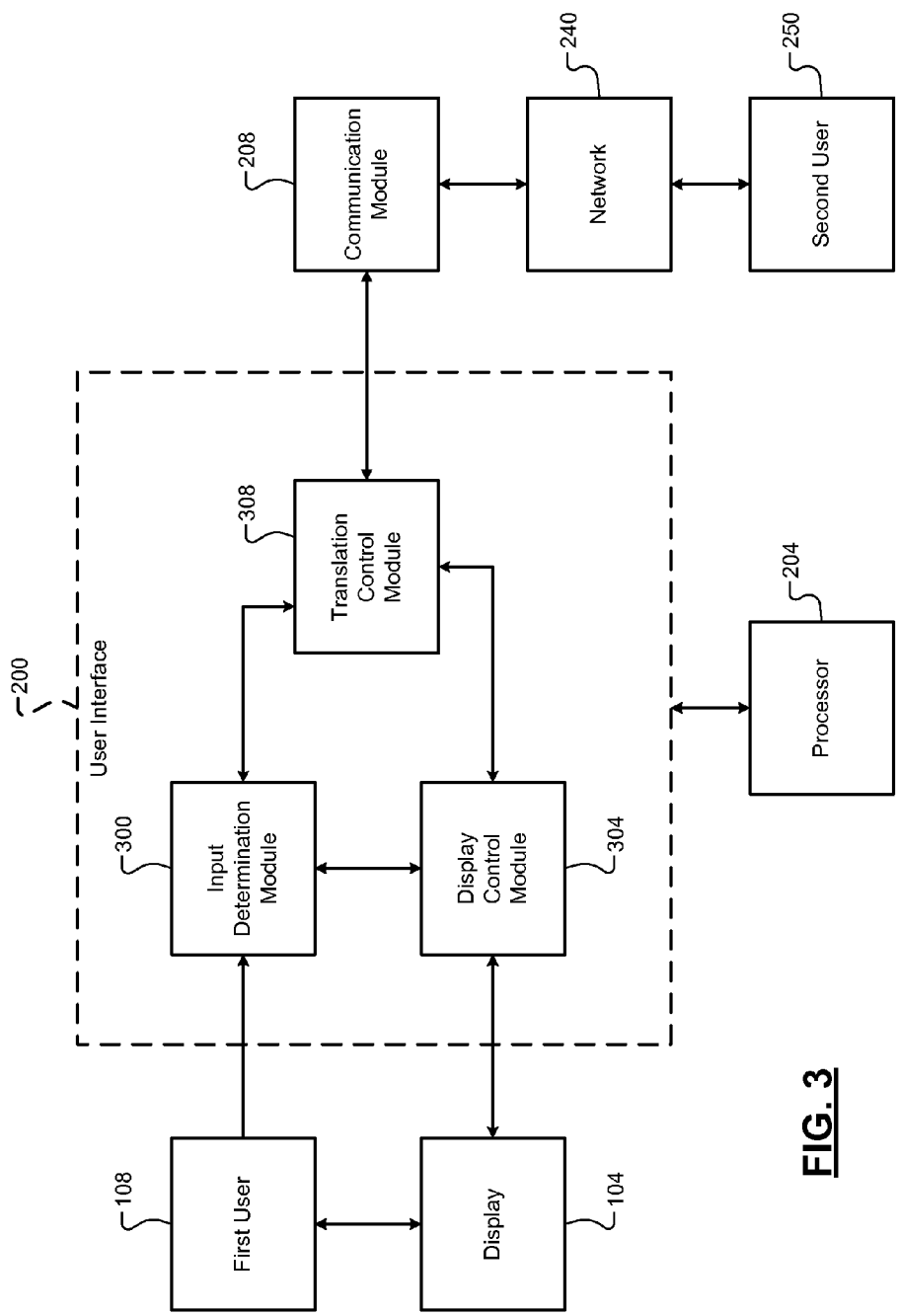
FIG. 3 is a functional block diagram of the user interface of FIG. 2.

Referring now to FIG. 3, a functional block diagram of the user interface 200 is illustrated. The user interface 200 can include an input determination module 300, a display control module 304, and a translation control module 308. It should be appreciated that the user interface 200 can also include other computing components such as memory.

The input determination module 300 determines input from the first user 108 to the computing device 100. The input determination module 300 can determine the one or more characters in an alphabet-based language, e.g., Pinyin. For example, the first user 108 can input the first input of one or more characters in the alphabet-based language and the second input of one or more characters in the alphabet-based language. The input determination module 300 can also determine a selection of pluralities of characters in a non-alphabet-based language, e.g., Chinese, displayed to the first user 108 at the display 104. As previously mentioned, the alphabet-based language can be a transliteration of the non-alphabet-based language. For example, the first user 108 can input the selection of one of the first plurality of characters in the non-alphabet-based language to obtain the selected character. The input determination module 300 can further determine one or more selections of various parameters by the first user 108. For example, the first user 108 can select a weighting factor, which is used in adjusting the coefficient based on the selected character (described in more detail below).

The display control module 304 controls information displayed at the display 104. The display control module 304 can display the first and second input at the display 104 after the first and second inputs are entered by the first user 108. The display control module 304 can also display the first and second pluralities of characters in the non-alphabet-based language at the display 104 for selection by the first user 108. As previously mentioned, the display 104 can be a touch display, e.g., a capacitive sensing display, and therefore the display control module 304 can also communicate with the input determination module 300 in determining the character input and/or selection by the first user 108.

The translation control module 308 controls translation of input received from the first user 108 from a source language, e.g., Pinyin, to a target language, e.g., Chinese. The translation control module 308 can determine the first plurality of characters in the non-alphabet-based language based on the first input and a coefficient indicating a gender of the second user 250. The translation control module 308 can also determine the second plurality of characters in the non-alphabet-based language based on the second input and a modified coefficient. Each of the first plurality of characters can represent potential translations of the first input, and each of the second plurality of characters can represent potential translations of the second input. The translation control module 308 can further determine and adjust the coefficient to obtain the modified coefficient (described in more detail below).

Figure 4:
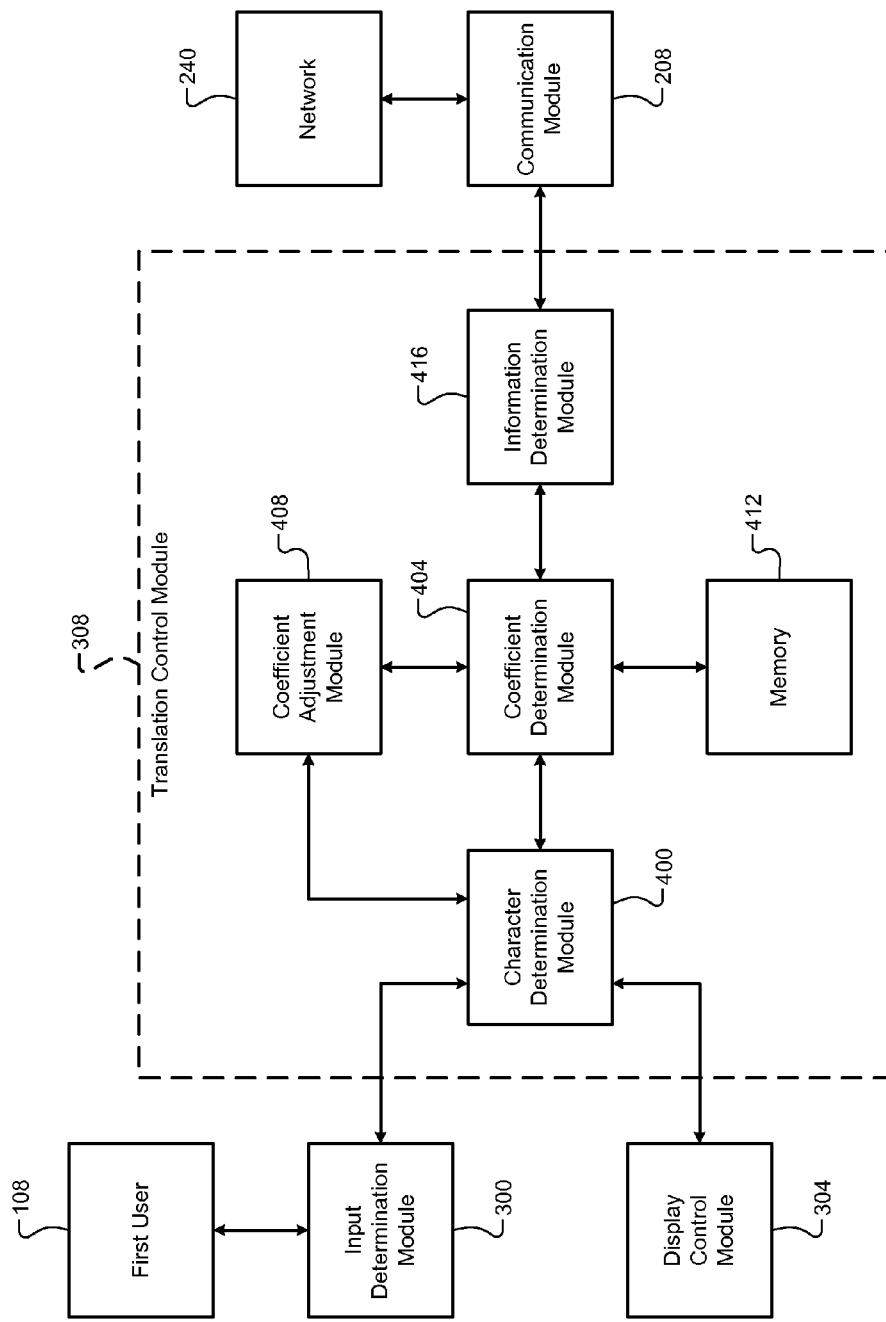
FIG. 4 is a functional block diagram of the translation control module of FIG. 3.

Referring now to FIG. 4, a functional block diagram of the translation control module 308 is illustrated. The translation control module 308 can include a character determination module 400, a coefficient determination module 404, a coefficient adjustment module 408, a memory 412, and an information determination module 416. It should be appreciated that the translation control module 308 can also include other components.

The character determination module 400 can determine the first plurality of characters in the non-alphabet-based language, e.g., Chinese, based on the first input received from the first user 108 and the coefficient. The character determination module 400 can also determine the second plurality of characters in the non-alphabet-based language based on the second input received from the first user 108 and the modified coefficient. For example, the character determination module 400 can determine the first and/or second pluralities of characters by generating probability scores for all possible characters.

Each probability score can indicate a likelihood that a particular character is an acceptable translation of the first/second input. The character determination module 400 can then select subsets of all the possible characters based on the probability scores to obtain the first and/or second pluralities of characters, e.g., select subsets of characters having higher probability scores than a remainder of the characters. In some implementations, the character determination module 400 can also determine the selected character based on the selection by the first user 108 of one of the first plurality of characters.

The coefficient determination module 404 determines the coefficient indicating the gender of the second user 250. The initial coefficient determined by the coefficient determination module 404 can be referred to as a base coefficient. The base coefficient can be retrieved from the memory 412. For example, the second user 250 may have an associated profile that is stored in the memory 412. The base coefficient may be determined based on a name associated with the second user 250, e.g., Jennifer. For example, the coefficient determination module 404 can access a dictionary or a name look-up table in order to determine the base coefficient based on the name associated with the second user 250.

The coefficient determination module 404 can also command the information determination module 416 to retrieve additional gender-related information associated with the second user 250 via the network 240, e.g., the Internet. For example, the information determination module 416 can perform a web-based search for the second user 250 and/or retrieve a social network profile associated with the second user 250. The additional gender-related information can be used by the coefficient determination module 404 in determining the base coefficient, e.g., when no profile for the second user 250 exists in the memory. For example only, some names, e.g., Jennifer, are associated predominantly with a female, whereas other names, e.g., Pat, are associated with either male or female almost equally. Additionally, for example only, some interests/activities could be predominantly associated with either the male or female genders.

In situations where there is no profile associated with the second user 250 and the information determination module 416 cannot retrieve any gender-related information associated with the second user 250 via the network 240, e.g., the Internet, the coefficient determination module 404 can determine the base coefficient to be a gender-neutral coefficient. The gender-neutral coefficient can be a coefficient indicating neither a male gender nor a female gender. Additionally, after the coefficient determination module 404 determines the base coefficient, the coefficient determination module 404 can store the base coefficient in the memory 412, e.g., in the existing profile or in a newly-created profile associated with the second user 250.

The coefficient adjustment module 408 can adjust the base coefficient based on the selected character by the first user 108 from the first plurality of characters. Specifically, the coefficient adjustment module 408 can adjust the base coefficient when the selected character indicates a particular gender of the second user 250. For example, the selected character could be one of the Chinese characters representing the words "you" (male), "you" (female), "him", or "her". In such cases, the coefficient adjustment module 408 can adjust the base coefficient towards a particular gender. For example only, if the base coefficient was determined to be the gender-neutral coefficient, and the selected character was the Chinese character representing "him", the coefficient adjustment module 408 could adjust the base coefficient towards the male gender. The adjusted coefficient may be referred to as the modified coefficient. In the example above, the modified coefficient would indicate that the second user 250 is a male.

As previously mentioned, the coefficient adjustment module 408 can adjust the base coefficient further based on the weighting factor. For example, the weighting factor can be input by the first user 108 or be predetermined. The weighting factor can indicate a degree by which the base coefficient is adjusted based on the selected character. An example weighted adjustment of the base coefficient to obtain the modified coefficient is illustrated below. The coefficients (the base coefficient and the modified coefficient) and the weighting factor can each be values ranging from 0 to 1. For example, 0 can represent male, 1 can represent female, and 0.5 can represent the gender-neutral coefficient. Additionally, for example, a weighting factor of 0 can represent a lowest degree (slowest rate) of adjustment and a weighting factor of 1 can represent a highest degree (fastest rate) of adjustment.

The coefficient adjustment module 408 can adjust the base coefficient to obtain the modified coefficient according to the following equation:

$$MC = W*G + (1-W)*C,$$

where MC represents the modified coefficient, W represents the weighting factor, G represents a gender indicate by the selected character, and C represents the base coefficient. As previously described, in the provided example MC, W, G, and C can each be values greater than or equal to zero and less than or equal to one. It should be appreciated that other ranges of values and other suitable weighting equations could also be implemented. It should be noted that a selected character that doesn't specify gender could have a value G of 0.5 (gender-neutral), which could cause the modified coefficient MC to be adjusted towards the gender-neutral value. In some implementations, however, the base coefficient could be adjusted to obtain the modified coefficient only when the selected character specifies gender, e.g., you (male), you (female), him, or her.

Figure 5:
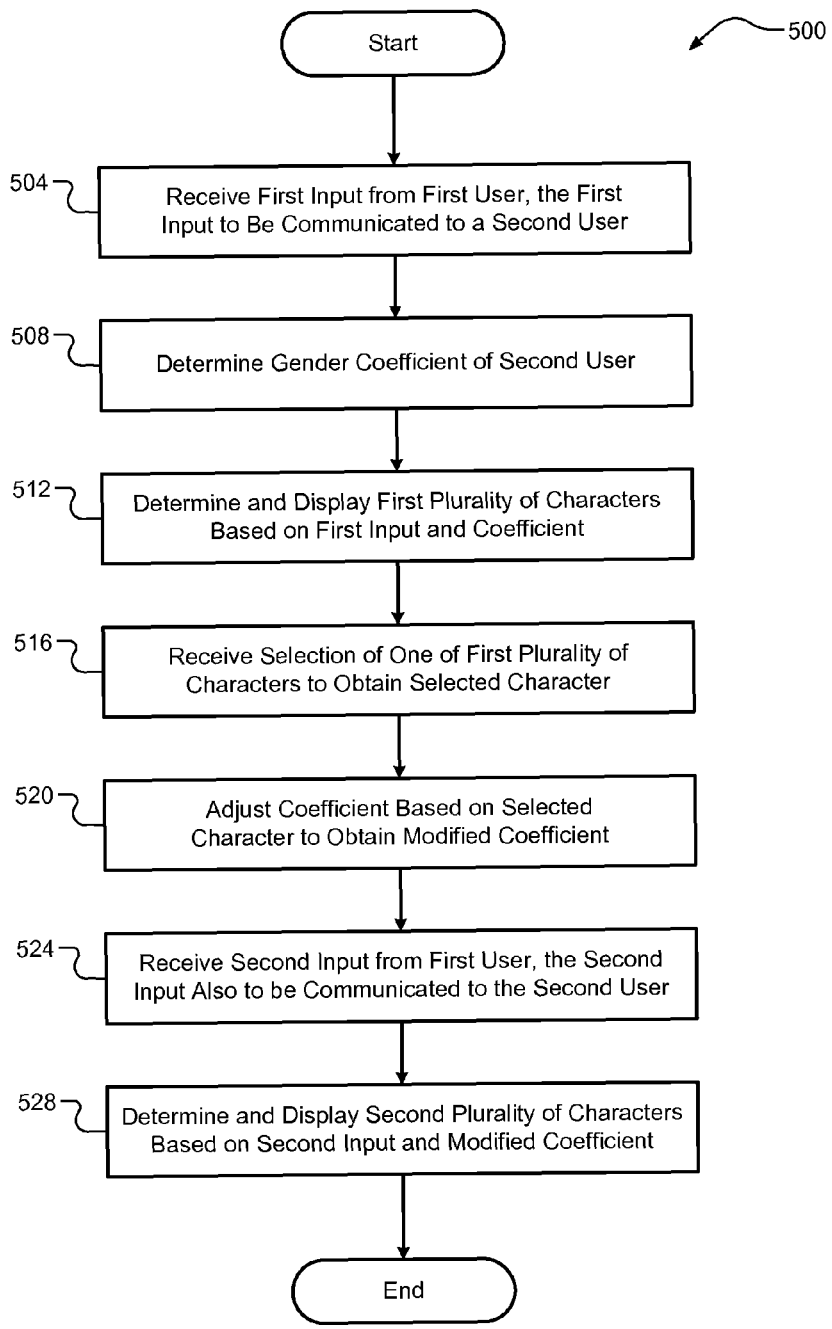
FIG. 5 is a flow diagram of an example technique for a gender weighted Pinyin input method editor (IME) according to some implementations of the present disclosure.

Referring now to FIG. 5, a flow diagram of an example technique 500 for a gender weighted Pinyin IME is illustrated. At 504, the input determination module 300 receives a first input from the first user 108. The first input can be intended for communication to the second user 250 and can include one or more characters of an alphabet-based language. The alphabet-based language can be a transliteration of a non-alphabet-based language. The non-alphabet-based language can be one of a logogram-based language and a syllabogram-based language. At 508, the coefficient determination module 404 determines the coefficient indicating the gender of the second user 250. At 512, the character determination module 400 determines a first plurality of characters of the non-alphabet-based language based on the first input and the coefficient. Each of the first plurality of characters can represent a potential translation of the first input. The first plurality of characters can then be displayed at the display 104 via the display control module 304.

At 516, the input determination module 300 receives a selection by the first user 108 of one of the first plurality of characters to obtain a selected character. At 520, the coefficient adjustment module 408 adjusts the coefficient based on the selected character to obtain a modified coefficient. At 524, the input determination module 300 receives a second input from the first user 108. The second input can also include one or more characters in the alphabet-based language. At 528, the character determination module 400 determines a second plurality of characters in the non-alphabet-based language based on the second input and the modified coefficient. Each of the second plurality of characters can represent a potential translation of the second input. The second plurality of characters can be displayed at the display 104 via the display control module 304. Control may then end or return to 504 for one or more additional cycles.

Figure 6:
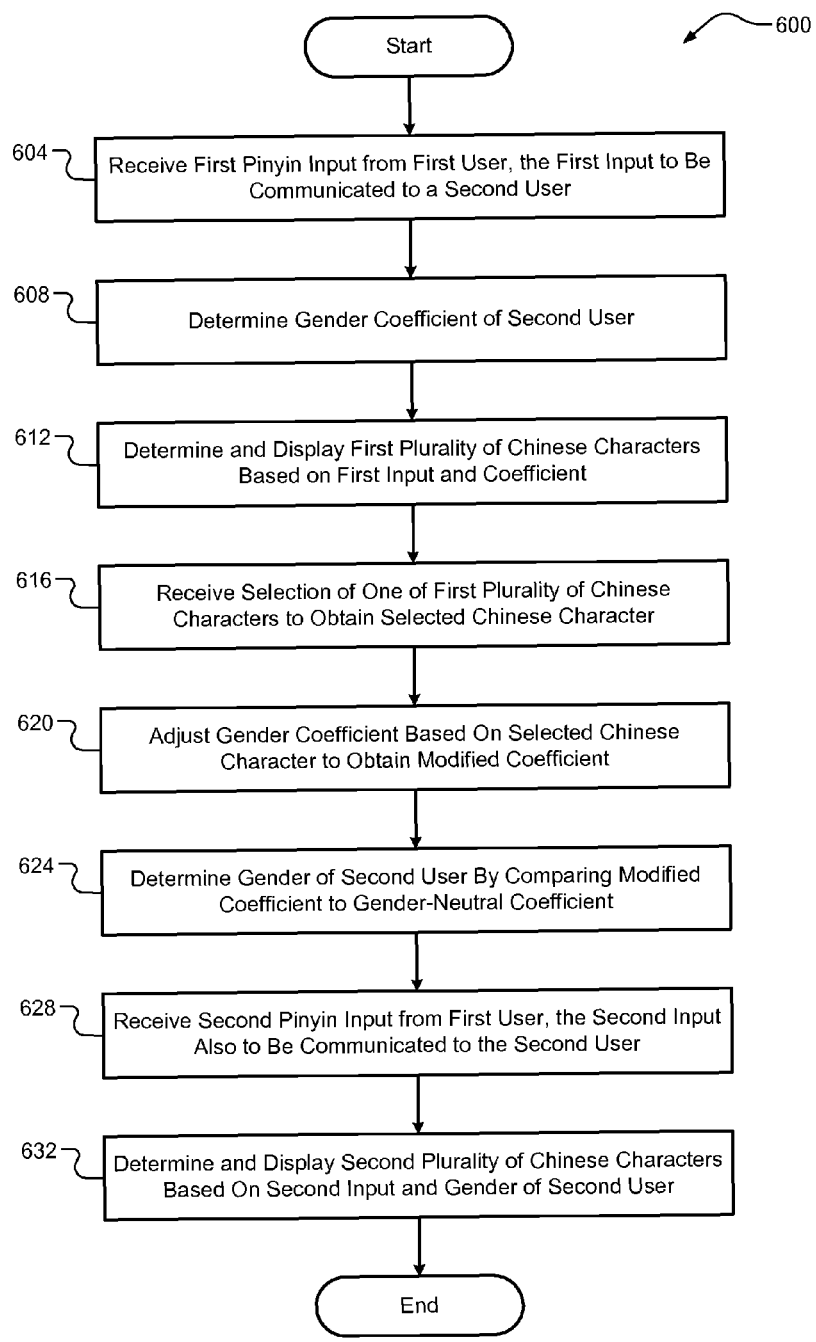
FIG. 6 is a flow diagram of another example technique for a gender weighted Pinyin IME according to some implementations of the present disclosure.

Referring now to FIG. 6, a flow diagram of another example technique 600 for a gender weighted Pinyin IME is illustrated. At 604, the input determination module 300 receives a first input from the first user 108. The first input can be intended for communication to the second user 250 and can include one or more Pinyin characters. At 608, the coefficient determination module 404 determines the coefficient indicating the gender of the second user 250. At 612, the character determination module 400 determines the first plurality of Chinese characters based on the first input and the coefficient. Each of the first plurality of Chinese characters can represent a potential translation of the first input. The first plurality of Chinese characters can be displayed at the display 104 via the display control module 304. At 616, the input determination module 300 receives a selection by the first user 108 of one of the first plurality of Chinese characters to obtain a selected Chinese character.

At 620, the coefficient adjustment module 408 adjusts the coefficient based on the selected character to obtain a modified coefficient. At 624, the coefficient determination module 404 determines the gender of the second user 250 by comparing the modified coefficient to the gender-neutral coefficient. At 628, the input determination module 300 receives a second input from the first user 108. The second input can include one or more Pinyin characters. At 632, the character determination module 400 determines a second plurality of Chinese characters based on the second input and the gender of the second user 250. Each of the second plurality of Chinese characters can represent a potential translation of the second input. The second plurality of Chinese characters can be displayed at the display 104 via the display control module 304. Control may then end or return to 604 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art.

These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
receiving, at a computing device including one or more processors, a first input from a user, the first input including one or more Pinyin characters, wherein the first input is to be communicated to a second user;
determining, at the computing device, a coefficient indicating a gender of the second user;
based on the first input and the coefficient, determining, at the computing device, a first plurality of Chinese characters, each of the first plurality of Chinese characters representing a potential translation of the first input;
displaying, at the computing device, the first plurality of Chinese characters;
obtaining, at the computing device, a first selected Chinese character by receiving a selection by the user of one of the first plurality of Chinese characters;
obtaining, at the computing device, a modified coefficient by adjusting the coefficient based on the first selected Chinese character;
determining, at the computing device, the gender of the second user by comparing the modified coefficient to a gender-neutral coefficient, wherein the gender of the second user is determined to be male when the modified coefficient is less than or equal to the gender-neutral coefficient, and wherein the gender of the second user is determined to be female when the modified coefficient is greater than the gender-neutral coefficient;
receiving, at the computing device, a second input from the user, the second input including one or more Pinyin characters, wherein the second input is also to be communicated to the second user;
based on the second input and the determined gender of the second user, determining, at the computing device, a second plurality of Chinese characters, each of the second plurality of Chinese characters representing a potential translation of the second input;
displaying, at the computing device, the second plurality of Chinese characters;
obtaining, at the computing device, a second selected Chinese character by receiving a selection by the user of one of the second plurality of Chinese characters;
constructing, by the computing device, an electronic message comprising the first and second selected Chinese characters; and
transmitting, from the computing device to a computing device associated with the recipient, the constructed electronic message.

2. A computer-implemented method, comprising:
receiving, at a computing device including one or more processors, a first input from a user, the first input including one or more characters of an alphabet-based language, wherein the alphabet-based language that is a transliteration of a non-alphabet-based language, the non-alphabet-based language being one of a logogram-based language and a syllabogram-based language, wherein the first input is to be communicated to a recipient;
determining, at the computing device, a coefficient indicative of a gender of the recipient;
based on the first input and the coefficient, determining, at the computing device, a first plurality of characters in the non-alphabet-based language, each of the first plurality of characters representing a potential translation of the first input;

displaying, at the computing device, the first plurality of characters;

obtaining, at the computing device, a first selected character by receiving a selection by the user of one of the first plurality of characters;

obtaining, at the computing device, a modified coefficient by adjusting the coefficient based on the first selected character;

receiving, at the computing device, a second input from the user, the second input including one or more characters of the alphabet-based language, wherein the second input is also to be communicated to the recipient;

based on the second input and the modified coefficient, determining, at the computing device, a second plurality of characters in the non-alphabet-based language, each of the second plurality of characters representing a potential translation of the second input;

displaying, at the computing device, the second plurality of characters;

obtaining, at the computing device, a second selected character by receiving a selection by the user of one of the second plurality of characters;

constructing, by the computing device, an electronic message comprising the first and second selected characters; and transmitting, from the computing device to a computing device associated with the recipient, the constructed electronic message.

3. The computer-implemented method of claim 2, wherein the determining of the coefficient indicative of the gender of the recipient includes retrieving, based on information associated with the recipient, a base coefficient.

4. The computer-implemented method of claim 3, wherein the information associated with the recipient includes a name, the name being a portion of a profile of the recipient, wherein the profile is stored in a memory of the computing device.

5. The computer-implemented method of claim 3, wherein the determining of the coefficient indicative of the gender of the recipient further includes retrieving, from a network, the information associated with the recipient, wherein the information retrieved from the network includes at least one of search engine results and a social network profile.

6. The computer-implemented method of claim 3, wherein the base coefficient is a gender-neutral coefficient when there is no gender-indicative information in a profile of the recipient, wherein the profile is stored in a memory of the computing device.

7. The computer-implemented method of claim 3, wherein the adjusting of the coefficient indicative of the gender of the recipient includes:

obtaining, at the computing device, a modified coefficient by adjusting, based on the selected character, the base coefficient; and storing, in a memory of the computing device, the modified coefficient.

8. The computer-implemented method of claim 7, wherein the adjusting of the base coefficient is further based on a weighting factor that indicates a degree by which the base coefficient is to be adjusted, wherein the weighting factor is either predetermined or is input, by the user, to the computing device.

9. The computer-implemented method of claim 8, wherein the modified coefficient is determined using the equation:

$$MC = W*G + (1-W)*C,$$

where MC represents the modified coefficient, W represents the weighting factor, G represents a gender indicated by the selected character, and C represents the base coefficient, wherein MC, W, G, and C are each values which are greater than or equal to zero and which are less than or equal to one.

10. The computer-implemented method of claim 9, further comprising based on a comparison between the modified coefficient and a gender-neutral coefficient, determining, at the computing device, the second plurality of characters, wherein the gender-neutral coefficient is 0.5.

11. The computer-implemented method of claim 10, wherein the second plurality of characters are determined to have a male gender when the modified coefficient is less than or equal to the gender-neutral coefficient, and wherein the second plurality of characters are determined to have a female gender when the modified coefficient is greater than the gender-neutral coefficient.

12. A computing system, comprising:

a user interface device configured to:
receive a first input from a user, the first input including one or more characters of an alphabet-based language, wherein the alphabet-based language is a transliteration of a non-alphabet-based language, the non-alphabet-based language being one of a logogram-based language and a syllabogram-based language, wherein the first input is to be communicated to a recipient, receive a second input from the user, the second input including one or more characters of the alphabet-based language, wherein the second input is also to be communicated to the recipient, obtain a first selected character by receiving a selection, by the user, of one of a first plurality of characters, wherein the first plurality of characters are in the non-alphabet-based language, and obtain a second selected character by receiving a selection, by the user, of one of a second plurality of characters, wherein the second plurality of characters are in the non-alphabet-based language;

one or more processors configured to:
determine a coefficient indicative of a gender of the recipient;

based on the first input and the coefficient, determine the first plurality of characters in the non-alphabet-based language, each of the first plurality of characters representing a potential translation of the first input, obtain a modified coefficient by adjusting, based on the first selected character, the coefficient, based on the second input and the modified coefficient, determine the second plurality of characters in the non-alphabet-based language, each of the second plurality of characters representing a potential translation of the second input, and construct an electronic message comprising the first and second selected characters; and a display configured to:
display the first plurality of characters, and
display the second plurality of characters; and a communication device configured to transmit the constructed electronic message to a computing device associated with the recipient.

13. The computing system of claim 12, wherein the one or more processors are configured to determine the coefficient indicative of the gender of the recipient by retrieving, based on information associated with the recipient, a base coefficient.

14. The computing system of claim 13, wherein the information associated with the recipient includes a name, the name being a portion of a profile of the recipient, wherein the profile is stored in a memory of the computing system.

15. The computing system of claim 13, wherein the one or more processors are configured to determine the coefficient indicative of the gender of the recipient by retrieving, from a network, the information associated with the recipient, wherein the information retrieved from the network includes at least one of search engine results and a social network profile.

16. The computing system of claim 13, wherein the base coefficient is a gender-neutral coefficient when there is no gender-indicative information in a profile of the recipient, wherein the profile is stored in a memory of the computing system.

17. The computing system of claim 13, wherein the one or more processors are configured to adjust the coefficient by:
  obtaining the modified coefficient by adjusting, based on the selected character, the base coefficient; and
  storing the modified coefficient in a memory of the computing system.

18. The computing system of claim 17, wherein the one or more processors are configured to adjust, based on a weighting factor, the base coefficient, wherein the weighting factor indicates a degree by which the base coefficient is to be adjusted, and wherein the weighting factor is either predetermined or is input by the user via the user interface device of the computing system.

19. The computing system of claim 18, wherein the modified coefficient is determined using the equation:

$$MC = W*G + (1-W)*C,$$

where MC represents the modified coefficient, W represents the weighting factor, G represents a gender indicated by the selected character, and C represents the base coefficient, wherein MC, W, G, and C are each values which are greater than or equal to zero and which are less than or equal to one.

20. The computing system of claim 19, wherein the one or more processors are further configured to determine, based on a comparison between the modified coefficient and a gender-neutral coefficient, the second plurality of characters, wherein the second plurality of characters are determined to have a male gender when the modified coefficient is less than or equal to the gender-neutral coefficient, and wherein the second plurality of characters are determined to have a female gender when the modified coefficient is greater than the gender-neutral coefficient.

* * * * *